US008115668B2

(12) United States Patent
Mochizuki (10) Patent No.: US 8,115,668 B2
(45) Date of Patent: Feb. 14, 2012

(54) OBJECT DETECTING APPARATUS FOR VEHICLE

(75) Inventor: Kazuhiko Mochizuki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 155 days.

(21) Appl. No.: 12/711,721

(22) Filed: Feb. 24, 2010

(65) Prior Publication Data

US 2010/0225521 A1    Sep. 9, 2010

(30) Foreign Application Priority Data

Mar. 5, 2009    (JP) .................................. 2009-052283

(51) Int. Cl.
*G01S 13/93* (2006.01)

(52) U.S. Cl. .............. 342/70; 342/71; 342/72; 342/188; 342/195

(58) Field of Classification Search .............. 342/70–72, 342/27, 90, 188, 195
See application file for complete search history.

(56) References Cited

U.S. PATENT DOCUMENTS

| | | | | |
|---|---|---|---|---|
| 6,218,961 | B1 * | 4/2001 | Gross et al. .................... | 340/903 |
| 6,268,803 | B1 * | 7/2001 | Gunderson et al. ........... | 340/903 |
| 6,675,094 | B2 * | 1/2004 | Russell et al. ................. | 701/301 |
| 6,970,129 | B2 * | 11/2005 | Kumon et al. .................. | 342/70 |
| 2003/0085835 | A1 * | 5/2003 | Matsui et al. .................... | 342/70 |
| 2005/0024258 | A1 * | 2/2005 | Matsuoka et al. ............... | 342/70 |
| 2005/0073433 | A1 * | 4/2005 | Gunderson et al. ........... | 340/903 |
| 2006/0119473 | A1 * | 6/2006 | Gunderson et al. ........... | 340/435 |
| 2007/0008211 | A1 * | 1/2007 | Yamano et al. ................. | 342/70 |
| 2010/0225521 | A1 * | 9/2010 | Mochizuki ....................... | 342/70 |

FOREIGN PATENT DOCUMENTS

| | | | |
|---|---|---|---|
| JP | 2000275339 A | * | 10/2000 |
| JP | 3959100 B2 | | 5/2007 |
| JP | 2010204027 A | * | 9/2010 |

* cited by examiner

*Primary Examiner* — John Sotomayor
(74) *Attorney, Agent, or Firm* — Arent Fox LLP

(57) ABSTRACT

An object candidate position detecting apparatus which detects a position of an object candidate includes a unifying mechanism which unifies a plurality of object candidates detected within a predetermined unified range into a single group. Where the relative positions of the object candidates stored in a unified information storage device changes such that the single group splits into a plurality of groups, a tracking mechanism judges whether any object candidate forming the group before the split continuously remains to be detected in a running lane in which a subject vehicle runs and which is estimated by a running lane estimator. Where any object candidate forming the group before the split is determined as continuously remaining to be detected in the running lane, the tracking mechanism determines that there is continuity between a group after the split including the thus-determined object candidate and the group before the split.

12 Claims, 10 Drawing Sheets

IT IS CHECKED WHETHER OR NOT TARGETS (T2, T3) CONSTITUTING PREVIOUS GROUP G, WHICH ARE PRESENT IN THE SAME LANE AS IS SUBJECT VEHICLE, ARE CONTINUOUSLY DETECTED IN CURRENTLY ESTIMATED EMERGING AREAS.

FIG.8B

IF THE TARGETS (T2, T3) EMERGE IN CURRENTLY ESTIMATED EMERGING AREAS, PREVIOUS GROUP G IS ASSOCIATED WITH GROUP INCLUDING THE TARGETS (T2, T3).

OBJECT DETECTING APPARATUS FOR VEHICLE

CROSS REFERENCE TO RELATED APPLICATION

This application claims the priority of Japanese Application No. JP 2009-052283, filed Mar. 5, 2009, the entire specification, claims and drawings of which are incorporated herewith by reference.

BACKGROUND OF THE INVENTION

1. Field of the Invention

The present invention relates to an object detecting apparatus for a vehicle for accurately tracking targets by grouping multiple targets detected by a transmitting/receiving mechanism in each predetermined detection cycle; and making a judgment on continuity between a group of targets detected in a previous detection cycle and a group of targets detected in a current detection cycle.

2. Description of the Related Art

Japanese Patent No. 3959100 (JP '100) discloses a drive control apparatus for a vehicle for controlling a driving condition of a subject vehicle relative to a representative point of a group into which multiple objects are unified by a unifying means when the multiple objects are detected within a predetermined range based on the transmission and reception results of an electromagnetic wave by a radar apparatus.

However, the drive control apparatus disclosed by JP '100 suffers from a drawback of when a group into which the multiple objects are unified by the unifying means splits into two groups, tracking the two groups is not adequately performed. Hence, vehicle control is inadequately performed relative to one of the split groups which does not include the vehicle running in front of the subject vehicle. A reason why such a drawback exists in the drive control apparatus disclosed in JP '100 is described in the following section entitled "DETAILED DESCRIPTION OF THE INVENTION" with reference to FIGS. 5 to 7B.

SUMMARY OF THE INVENTION

The present invention has been attained with at least the above-described drawback in the related art being taken into consideration. An aspect of the present invention is to perform adequate tracking when a single group into which the object candidates are unified by the unifying means splits into two or more groups.

According to a first feature of the present invention, an object detecting apparatus for a vehicle is provided that includes a transmitting/receiving mechanism which transmits an electromagnetic wave in a driving direction of a subject vehicle at predetermined intervals and which receives a reflected wave from an object, the transmitting/receiving mechanism being installed in a vehicle; an object candidate position detecting mechanism which detects a position of an object candidate based on a result of the transmission and reception performed by the transmitting/receiving mechanism; a unifying mechanism which unifies or arranges a plurality of object candidates into a single group in a case where the plurality of object candidates are detected within a predetermined unified range; a group representative point calculating mechanism which calculates a representative point of the group unified by the unifying mechanism; a tracking device which judges whether there is continuity between a group made in a previous detection cycle and a group made in a current detection cycle based on the group representative point calculation; and an object information outputting mechanism which outputs a representative point of a group after a split, based on an output from the group representative point calculating mechanism and an output from the tracking device. The apparatus also includes a unified information storage device which stores the object candidates constituting each group; and a running lane estimating mechanism which estimates a running lane in which the subject vehicle runs. The afore-mentioned components are configured and arranged such that in a case where a change in the relative positions of the plurality of object candidates of the single group splits the single group into a plurality of groups having representative points located in different lanes, the tracking device judges whether any of the object candidates constituting the group before the split continuously remains to be detected in a running lane including the representative point of the group before the split based on an output from the unified information storage device and an output from the running lane estimating mechanism, and in a case where any of the object candidates constituting the single group before the split is determined as continuously remaining to be detected in the running lane, the tracking device determines that there is continuity between a group after the split including the thus-determined object candidate and the group before the split.

With the above described structural configuration, when the object candidate position detecting mechanism detects a position of an object candidate based on the result of the transmission and reception of the electromagnetic wave performed by the transmitting/receiving mechanism, the unifying mechanism unifies a plurality of object candidates detected within the predetermined unified range as a single group and then the group representative point calculating mechanism calculates a representative point of the unified group. Thereafter, the tracking device judges whether there is continuity between the group made in the previous detection cycle and the group made in the current detection cycle based on the representative positions of the groups. In this regard, in a case where the relative positions of the object candidates stored in the unified information storage device changes and thus the single group splits into a plurality of groups, the tracking device judges whether any of the object candidates constituting the group before the split continuously remains to be detected in the running lane in which the subject vehicle runs and which is estimated by the running lane estimating mechanism; and in a case where any of the object candidates constituting the group before the split is determined as continuously remaining to be detected in the running lane, the tracking device determines that there is continuity between the group after the split including the thus-determined object candidate and the group before the split. Accordingly, it is possible to prevent performing an inappropriate vehicle control by erroneously associating the group detected in the subject vehicle's lane with the split group in a lane other than the subject vehicle's lane.

According to a second feature of the present invention, the tracking device sets up an emergence estimation area where an object candidate detected in a previous detection cycle is expected to be detected in a current detection cycle. Thus, in a case where an object candidate is detected in the emergence estimation area, which is situated in the running lane including the representative point of the group before the split, the tracking device determines that any of the object candidates constituting the group before the split is continuously detected in the running lane, including the representative point of the group before the split.

With the above described structural configuration, since the tracking device sets up the emergence estimation area, and in a case where the object candidate is detected in the emergence estimation area, the tracking device determines that any of the object candidates constituting the group before the split is continuously detected in the running lane including the representative point of the group before the split, it is possible to prevent erroneously associating the object candidates of the group before the split with the group after the split, including the different object candidates.

According to a third feature of the present invention, the tracking device sets up the emergence estimation area as an area extending longitudinally and transversely which is included within a predetermined range from a previous position of the object candidate.

With the above described structural configuration, since the tracking device sets up the emergence estimation area as an area extending longitudinally and transversely which is included within a predetermined range from a previous position of the object candidate, it is possible to reliably confirm the corresponding relationship between the previous position and the current position of the object candidate.

According to a fourth feature of the present invention, the running lane estimating mechanism estimates the running lane in which the subject vehicle runs based on a vehicle speed of the subject vehicle detected by a vehicle speed sensor and a yaw rate of the subject vehicle detected by a yaw rate sensor.

With the above described structural configuration, since the running lane estimating mechanism estimates the running lane in which the subject vehicle runs based on a vehicle speed and a yaw rate of the subject vehicle, it is possible to easily estimate the running lane and to do so with high precision.

According to a fifth feature of the present invention, the group representative point calculating mechanism calculates a transverse location of a representative point of a group as a middle position between leftmost and rightmost object candidates among the plurality of object candidates, and also calculates a longitudinal location of the representative point of the group as a position of an object candidate which is the nearest to the subject vehicle among the plurality of object candidates.

With the above described structural configuration, since the group representative point calculating mechanism calculates a transverse location of a representative point of a group as a middle position between leftmost and rightmost object candidates among the plurality of object candidates, and calculates a longitudinal location of the representative point of the group as a position of an object candidate which is the nearest to the subject vehicle among the plurality of object candidates, it is possible to make the obtained representative position of the group accurate.

The above description, other aspects, characteristics and advantages of the present invention will be clear from detailed descriptions which will be provided for the preferred embodiment referring to the attached drawings.

DESCRIPTION OF THE PREFERRED EMBODIMENT

A detailed description of a preferred embodiment of the present invention is provided below while referring to FIGS. 1 to 10.

Figure 1:
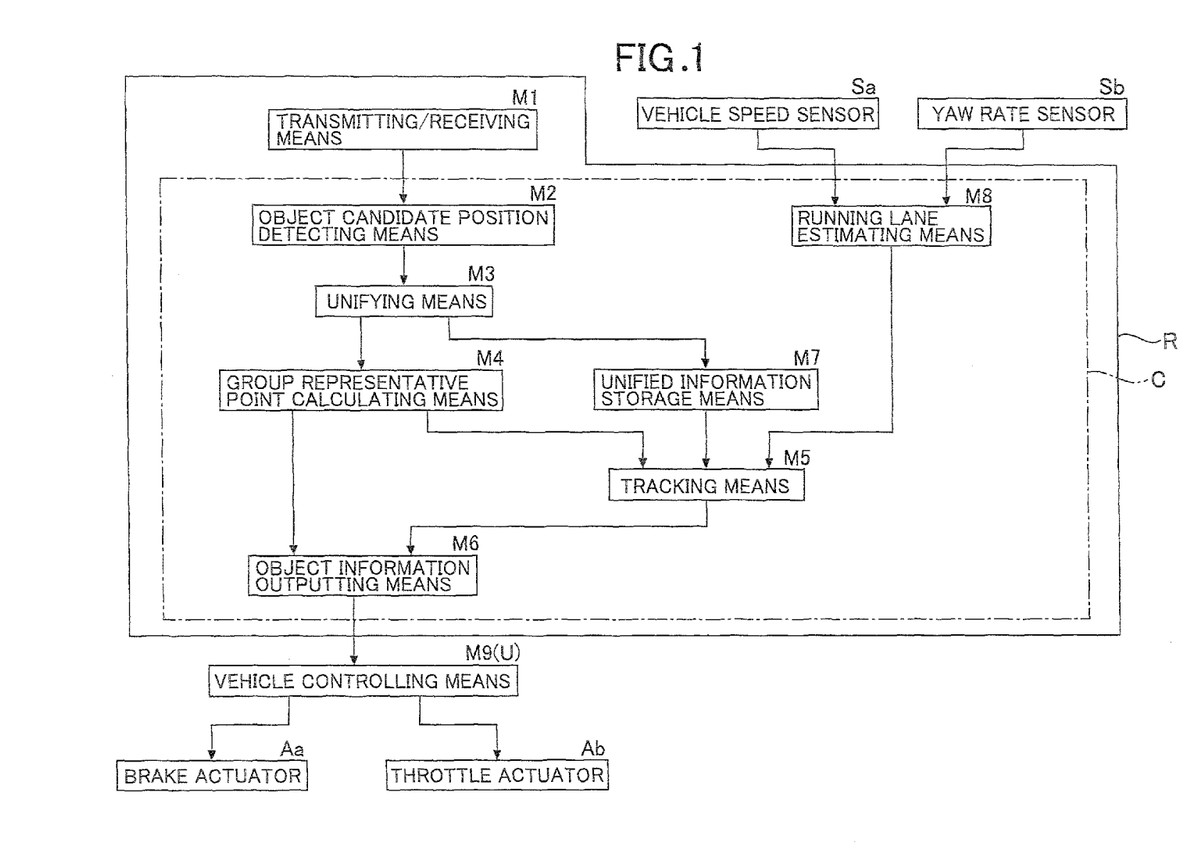
FIG. 1 is a schematic diagram of an object detecting apparatus for a vehicle according to a preferred embodiment of the present invention.

As shown in FIG. 1, an FMCW (Frequency Modulated Continuous Wave) radar system R includes a transmitting/receiving means M1, an object candidate position detecting means M2, a unifying means M3, a group representative point calculating means M4, a tracking means M5, an object information outputting means M6, a unified information storage means M7, and a running lane estimating means M8. A vehicle speed sensor Sa and a yaw rate sensor Sb are connected to the running lane estimating means M8. A vehicle controlling means M9 having an electronic control unit U is connected to the object information outputting means M6. A brake actuator Aa and a throttle actuator Ab are connected to the vehicle controlling means M9.

Figure 2:
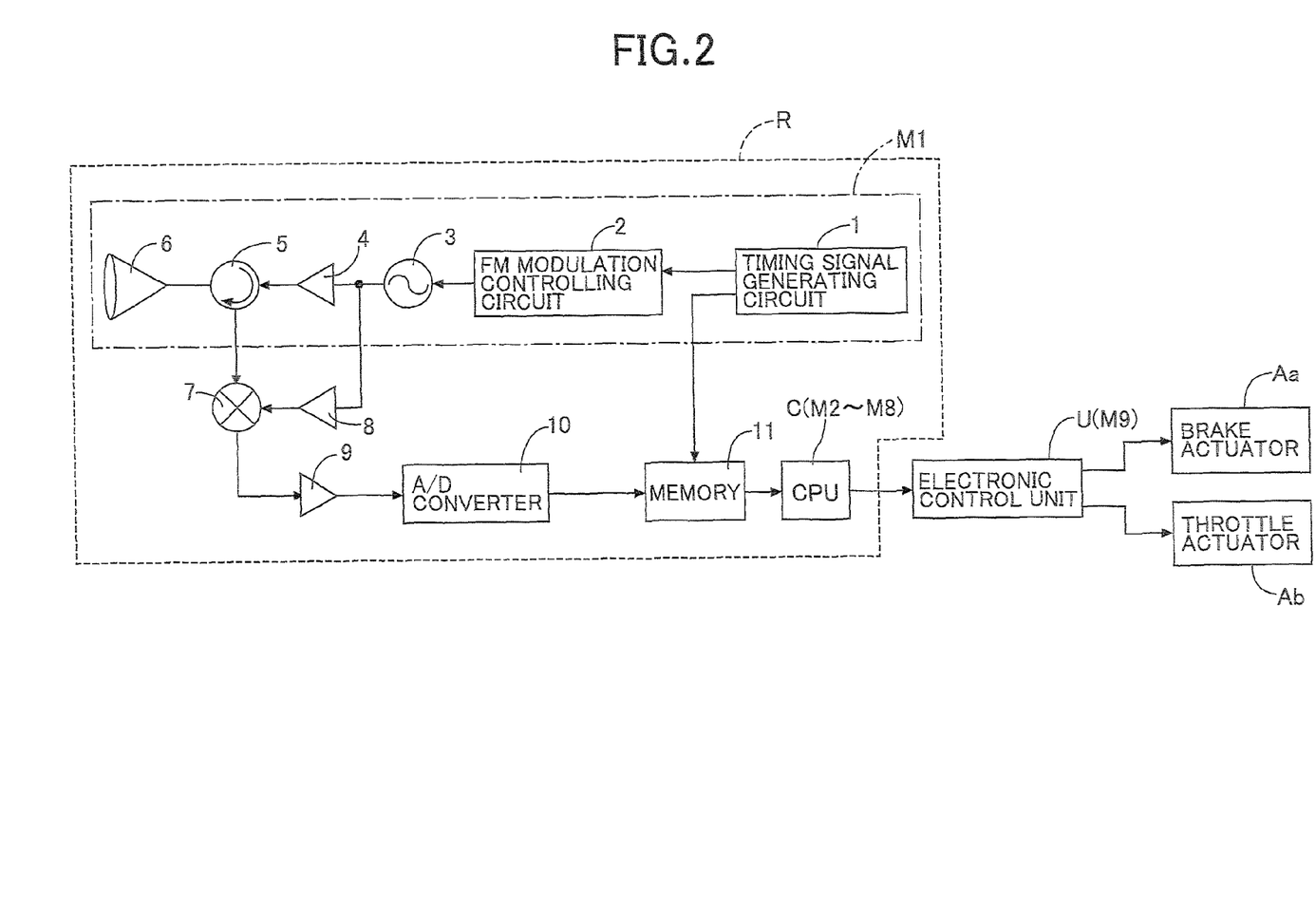
FIG. 2 is a schematic diagram of a FMCW (Frequency Modulated Continuous Wave) radar system.
Figure 3A:
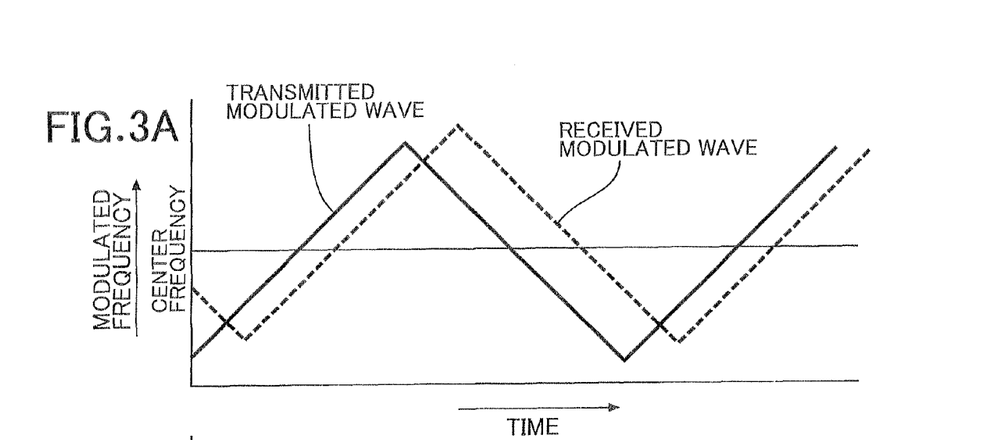
FIGS. 3A and 3B are graphs showing a waveform and a peak frequency of transmitted/received waves when an object approaches a transmitting/receiving mechanism.
Figure 3B:
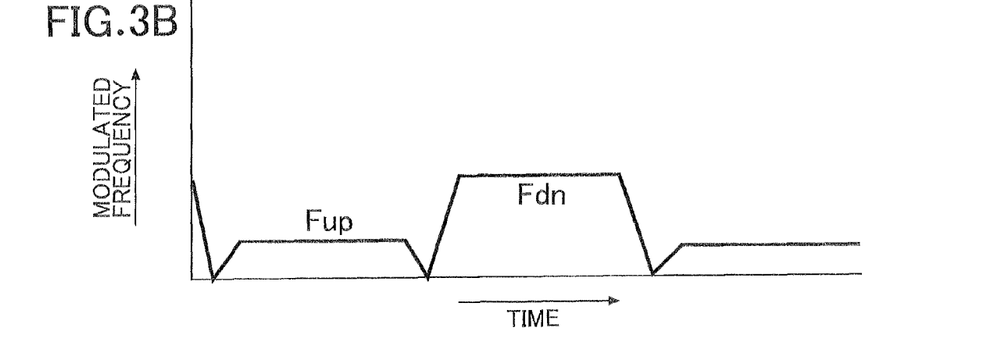
Figure 4A:
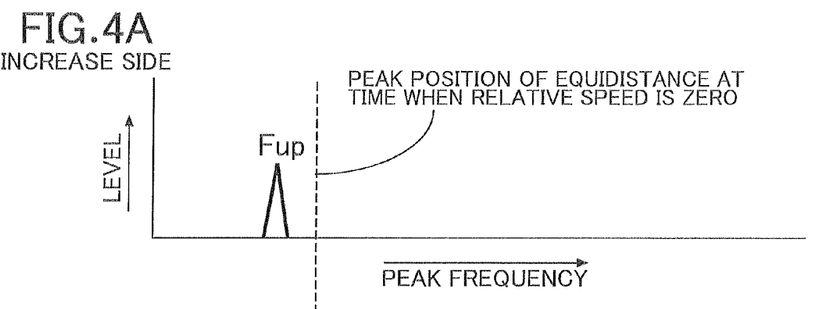
FIGS. 4A and 4B are graphs showing a peak signal.
Figure 4B:
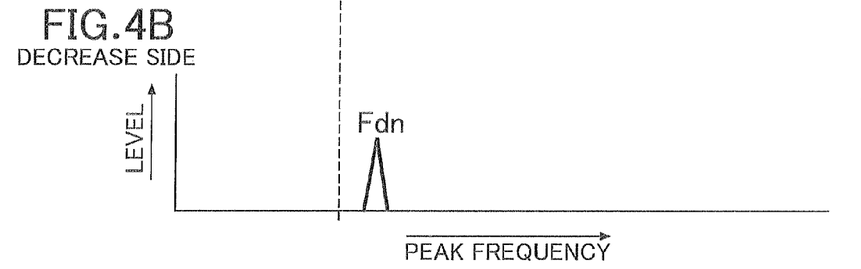

The configuration of the FMCW radar system R will now be provided while referring to FIGS. 2 to 4.

As shown in FIG. 2, the transmitting/receiving means M1 is configured to include a timing signal generating circuit 1, an FM modulation controlling circuit 2, an oscillator 3, an amplifier 4, a circulator 5, and a transmission/reception antenna 6. Based on a timing signal inputted from the timing signal generating circuit 1, the FM modulation controlling circuit 2 modulates and controls oscillation of the oscillator 3. Thus, as shown by a solid line in FIG. 3A, the frequency of the signal is modulated into a frequency with triangular waveforms. The thus-modulated transmission signal from the oscillator 3 is inputted into the transmission/reception antenna 6 through the amplifier 4 and the circulator 5. As such, an FMCW wave is transmitted from the transmission/reception antenna 6. When an object, such as a front-running vehicle, is ahead of the transmission/reception antenna 6, a reflected wave resulting from the transmitted wave reflecting off of the object is received by the transmission/reception antenna 6. The reflected wave appears, for instance, as shown by a broken line in FIG. 3A, when the object ahead comes closer. On each increase side where the frequency of the transmitted wave linearly increases, the reflected wave appears with a frequency lower than that of the transmitted wave, and appears later than the transmitted wave. On each decrease side where the frequency of the transmitted wave linearly decreases, the reflected wave appears with a frequency higher than that of the transmitted wave, and appears later than the transmitted wave.

The radar system R further includes a mixer 7, additional amplifiers 8 and 9, an A/D converter 10, a memory 11, and a central processing unit C. The central processing unit C defines the object candidate position detecting means M2, the unifying means M3, the group representative point calculating means M4, the tracking means M5, the object information outputting means M6, the unified information storage means M7, and the running lane estimating means M8.

The received wave received by the transmission/reception antenna 6 is inputted into the mixer 7 through the circulator 5. In addition to the received wave from the circulator 5, a transmitted wave, which is distributed from the transmitted wave outputted from the oscillator 3, is inputted into the mixer 7 through the amplifier 8. The mixer 7 mixes the transmitted wave and the received wave. Thereby, as shown in FIG. 3B, the mixer 7 generates a beat signal which has a peak frequency Fup on each increase side where the frequency of the transmitted/received wave linearly increases; and a peak frequency Fdn on each decrease side where the frequency of the transmitted/received wave linearly decreases.

The beat signal obtained by the mixer 7 is amplified to a predetermined amplitude level by the amplifier 9. The resultant beat signal is converted from analog to digital by the A/D converter 10 at each sampling time. Thus, a digitalized data set is stored and retained in chronological order in the memory 11. The timing signal is inputted into the memory 11 from the timing signal generating circuit 1. In response to the timing signal, the memory 11 stores and retains the data set on each increase side where the frequency of the transmitted/received signal increases, and on each decrease side where the frequency thereof decreases.

Based on the data set stored in the memory 11, the central processing unit C calculates an angle, distance and relative speed, at which the object is detected, based on the subject vehicle, and sends the calculation results to the electronic control unit U in a manner that is described below. Upon reception of the signal from the central processing unit C, the vehicle controlling means M9, which includes the electronic control unit U, controls the operations, respectively, of the brake actuator Aa and the throttle actuator Ab, for the purpose of keeping a constant distance between the subject vehicle and, for example, the front-running vehicle.

It should be noted that the search by the radar system R to detect an object is performed at cycles of 100 msec, for instance.

The object candidate position detecting means M2 in the central processing unit C first analyzes the frequency of the beat signal by applying the FFT (Fast Fourier Transform) to the data set on the beat signal stored in the memory 11, and thus finds a spectral distribution. Based on the spectral data set, the object candidate position detecting means M2 detects a spectrum (a peak signal), the detection level of which reaches the maximum value that is equal to or more than a predetermined threshold value. The peak signal on the increase side shown in FIG. 4A and the peak signal on the decrease side shown in FIG. 4B are detected symmetrically with respect to a peak position at a time when the relative speed between the subject vehicle and the object is "zero". Hence, based on the peak frequency Fup on the increase side and the peak frequency Fdn on the decrease side, the object candidate position detecting means M2 calculates the distance of the object from the subject vehicle and the relative speed between the object and the subject vehicle. Specifically, the object candidate position detecting means M2 calculates the distance of the subject vehicle to the object based on the sum of the two peak frequencies Fup, Fdn, and the relative speed between the subject vehicle and the object based on the difference between the two peak frequencies Fup, Fdn. Furthermore, based on the direction in which the transmitted wave is transmitted when the object is detected, the object candidate position detecting means M2 calculates the angle (direction) of the object.

Figure 5:
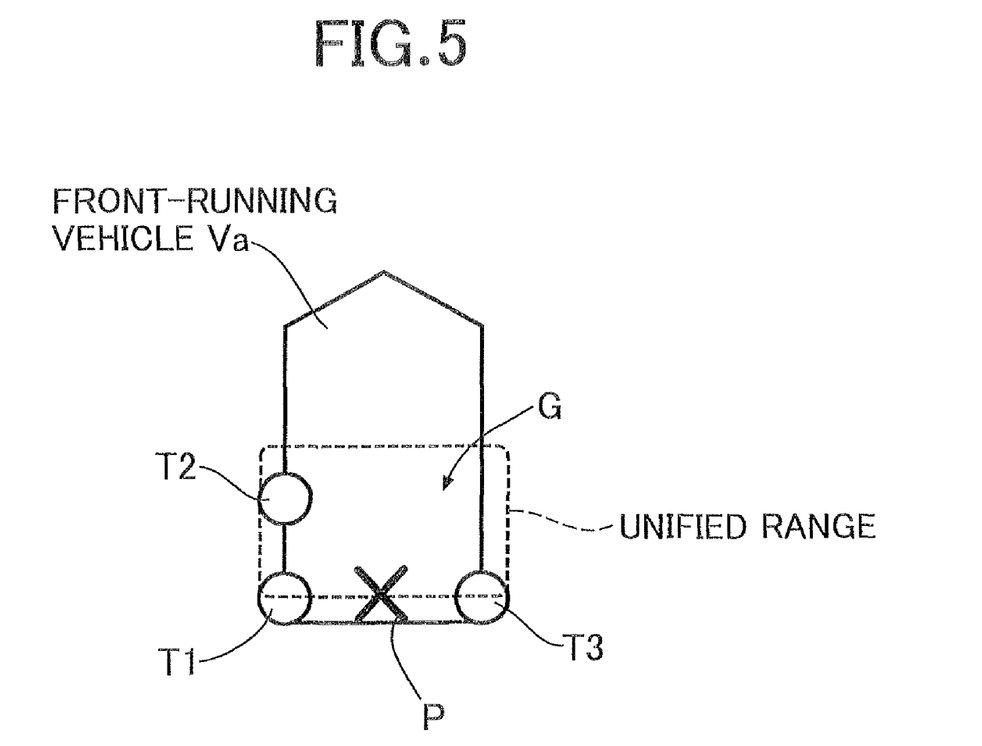
FIG. 5 is a schematic diagram used to explain operation of a unifying mechanism and a group representative point calculating mechanism.

Suppose a case where: as shown in FIG. 5, three targets T1 to T3 are detected from a front-running vehicle Va, which is running ahead in the same lane as a subject vehicle is running; and the three targets T1 to T3 are located within a predetermined unified range. In this case, because the speeds of the respective three targets T1 to T3, relative to the speed of the subject vehicle are equal to one another, the unifying means M3 unifies the three targets T1 to T3 into a single group G. The group representative point calculating means M4 calculates a transverse location of the representative point P of the group as the middle position between the leftmost target T1 and the rightmost target T3, as well as a longitudinal location of the representative point P as the position of the target T1 (or T3) which is nearest to the subject vehicle. The calculation of the representative point P of the group makes it possible to accurately define the representative point P of the obtained group.

Figure 6:
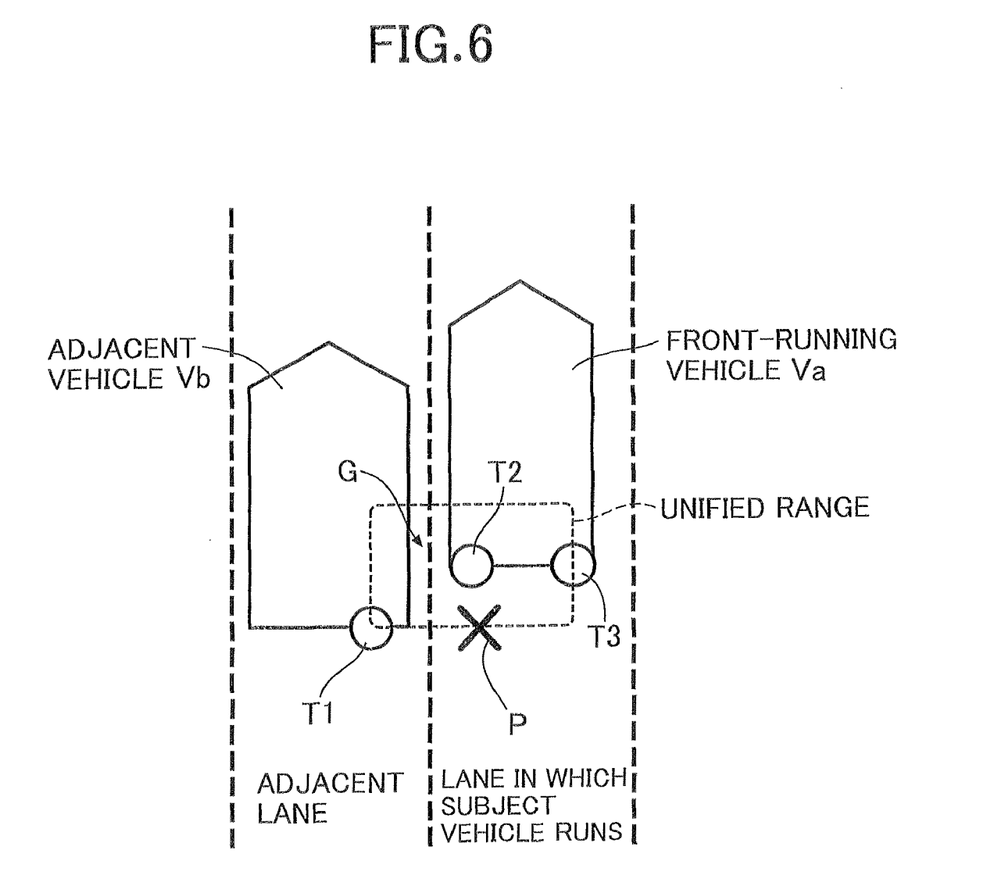
FIG. 6 is a schematic diagram used to explain a case in which a front-running vehicle and an adjoining vehicle are unified into a single group.

Suppose a case where: as shown in FIG. 6, the front-running vehicle Va is running in the same lane as the subject vehicle and an adjacent vehicle Vb running in an adjacent lane are running side-by-side at the same speed; and a target T1 is detected from the adjacent vehicle Vb whereas two targets T2, T3 are detected from the front-running vehicle Va. In a case where the detection of the three targets T1 to T3 is achieved within the predetermined unified range while the speeds of the respective three targets T1 to T3 relative to the speed of the subject vehicle are equal to one another, the unifying means M3 unifies the three targets T1 to T3 into a group G, and thus recognizes the group G as a single object as enclosed by the broken line. The group representative point calculating means M4 sets the transverse location of the representative point P of the group G in the middle position between the leftmost target T1 and the rightmost target T3, as well as sets the longitudinal location of the representative point P at the position of the target T1, which is the nearest to the subject vehicle.

The unified information storage means M7 stores the positions of the respective three targets T1 to T3, which are unified by the unifying means M3.

Figure 7A:
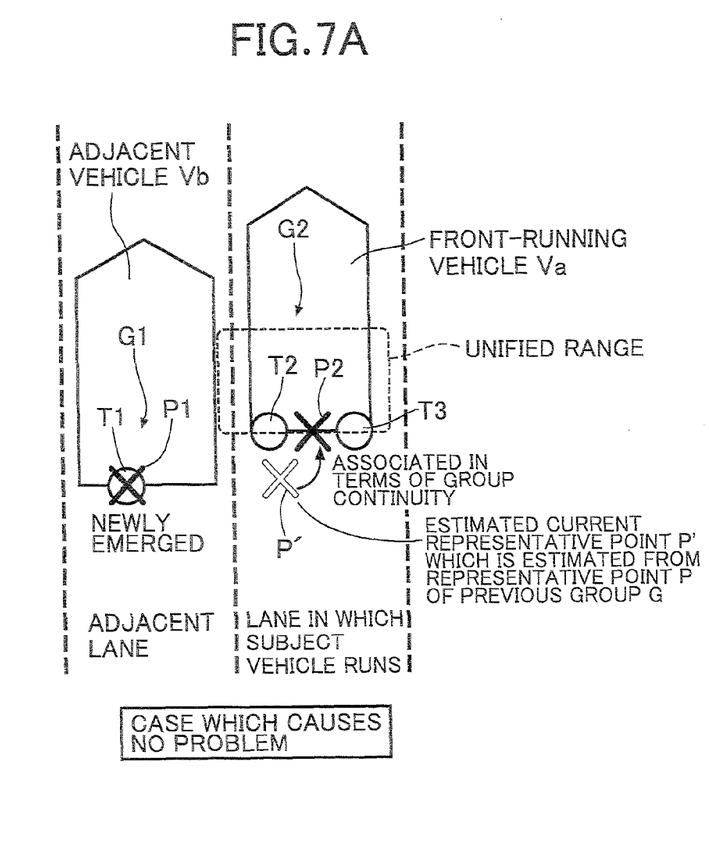
FIGS. 7A and 7B are sketches used to explain a drawback that occurs when operating a conventional tracking mechanism.

Next, suppose a case where the three targets T1 to T3 move from the positions shown in FIG. 6, which have been detected in the previous cycle, to the positions shown in FIG. 7A, which are detected in the current detection cycle. In the current detection cycle, there may be a case where the three targets T1 to T3 do not gather into the same unified range; the target T1 enters a left unified range to make a group G1; and the targets T2, T3 enter a right unified range to make a group G2. In this case, the tracking means M5 associates the previous group G with either the current first group G1 or the current second group G2 (or the previous group G is tracked by either the current first group G1 or the current second group G2).

The conventional art performs the tracking operation as follows.

Based on the previous representative point P of the previous group G shown in FIG. 6, a currently estimated representative point P' shown in FIG. 7A is estimated from the position and speed of the previous representative point P relative to the subject vehicle. After that, the distance between the representative point P1 of the current first group G1 and the currently estimated representative point P' is compared with the distance between the representative point P2 of the current second group G2 and the currently estimated representative point P'. If the latter distance is shorter than the former distance, the previous group G is tracked by the current second group G2.

In this case, a vehicle-to-vehicle distance control, which has been achieved relative to the group G present in the same lane as is the subject vehicle in the previous detection cycle, continues to be similarly achieved relative to the current second group G2 present in the same lane as is the subject vehicle in the current detection cycle. Accordingly, the vehicle-to-vehicle distance control relative to the front-running vehicle present in the same lane as the subject vehicle is continuously performed without trouble.

Figure 7B:
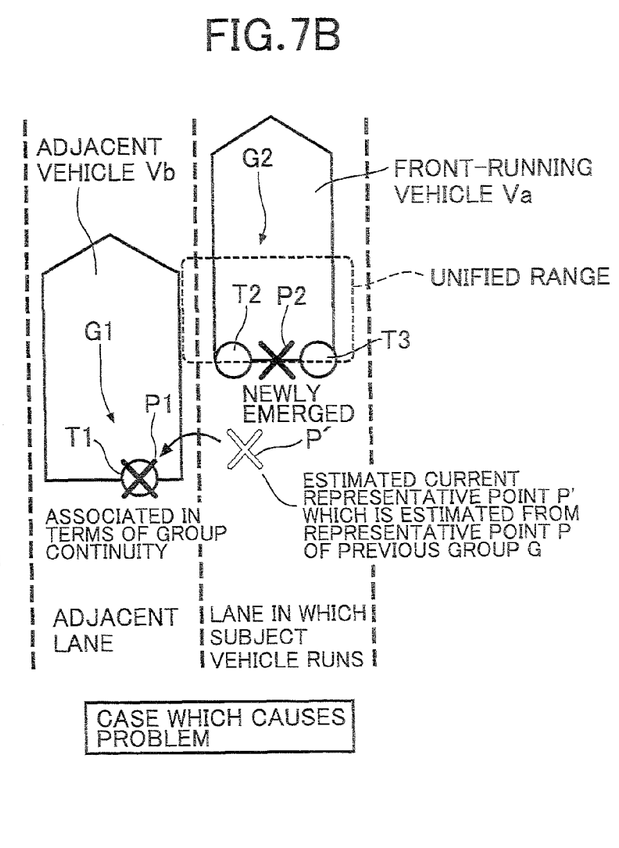

On the other hand, as shown in FIG. 7B, if the distance between the representative point P1 of the current first group G1 and the currently estimated representative point P' is shorter than the distance between the representative point P2 of the current second group G2 and the currently estimated representative point P', as a result of the comparison between the former distance and the latter distance, the previous group G is tracked by the current first group G1. In this case, the vehicle-to-vehicle distance control, which has been achieved relative to the group G present in the same lane as the subject vehicle in the previous detection cycle, is taken over by the vehicle-to-vehicle distance control, which is achieved relative to the adjacent vehicle Vb present in the adjacent lane in the current detection cycle. Accordingly, it is more likely that the vehicle-to-vehicle distance between the subject vehicle and the front-running vehicle Va, which is actually present in the same lane as the subject vehicle, may be increased or decreased inadequately.

The present invention solves the foregoing drawback as follows.

Figure 8A:
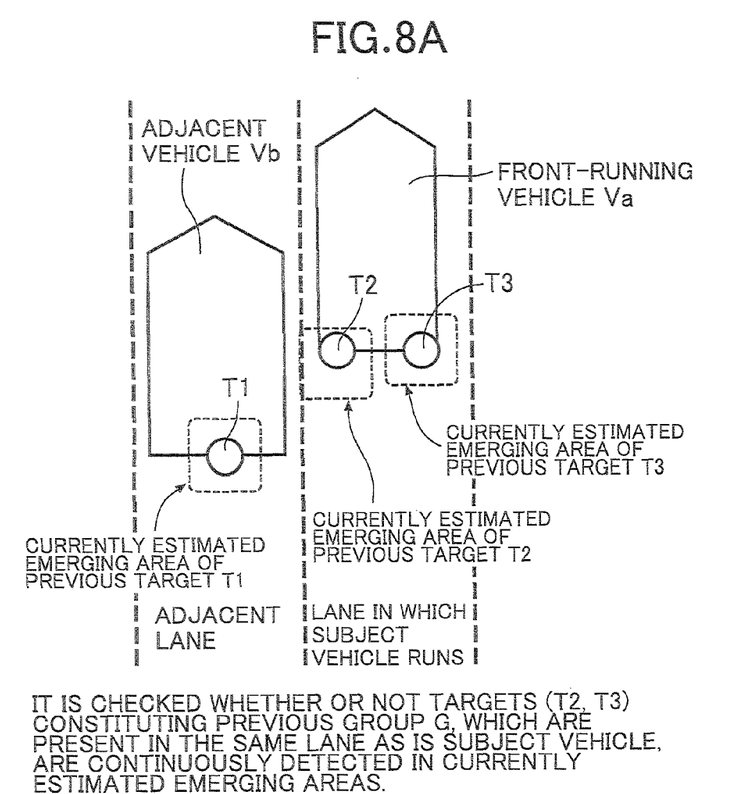
FIGS. 8A and 8B are sketches explaining how the tracking device of the present invention operates.

The running lane estimating means M8 shown in FIG. 1 estimates a future course of the subject vehicle, namely a lane in which the subject vehicle will run in the future, based on the vehicle speed detected by the vehicle speed sensor Sa and the yaw rate detected by the yaw rate sensor Sb. Accordingly, the running lane in which the subject vehicle will run in the future may easily and accurately be estimated. The tracking means M5 checks whether the current positions of the targets T1 to T3 are situated in currently estimated emerging areas (square areas measuring ±1 m in the longitudinal direction and ±1 m in the transverse direction) which are set around the previous positions of the targets T1 to T3, respectively, as shown in FIG. 8A. The check by the tracking means M5 is performed when the three targets T1 to T3, which have existed within the same unified range in the previous detection cycle, as shown in FIG. 6, no longer fall within the same unified range in the current detection cycle and the target T1 constitutes the group G1 as a result of falling within the left unified range whereas the targets T2, T3 constitute the group G2 as a result of falling within the right unified range. Thus, it is possible to securely check on the corresponding relationship between the previous positions and current positions of the targets T1 to T3, respectively.

Figure 8B:
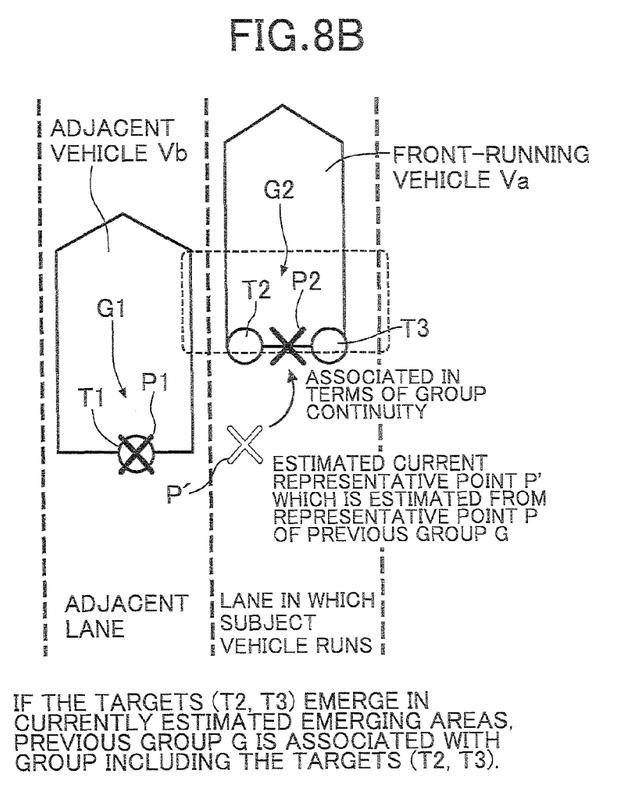

Once the current positions of the targets T1 to T3 are found to exist in the estimated emerging areas as a result of the check by the tracking means M5, the second group G2, including the targets 12, T3, which are present in the same lane as the representative point P of the previous group G (in the same lane as is the subject vehicle), is associated with the previous group G, as shown in FIG. 8B. Thus, the previous group G is tracked by the second group G2. For this reason, even if, out of the first and second groups G1, G2 into which the previous group G splits up or is divided, the distance between the representative point P1 of the first group G1 and the currently estimated point P1, which is estimated from the previous representative point P, is shorter than the distance between the representative point P2 of the second group G2 and the currently estimated point P1 (see FIG. 7B), the first group G1 is regarded as a group which newly emerges. The second group G2 is continuously treated as the basis of the vehicle-to-vehicle distance control by making the previous group G tracked by the second group G2.

Figure 9:
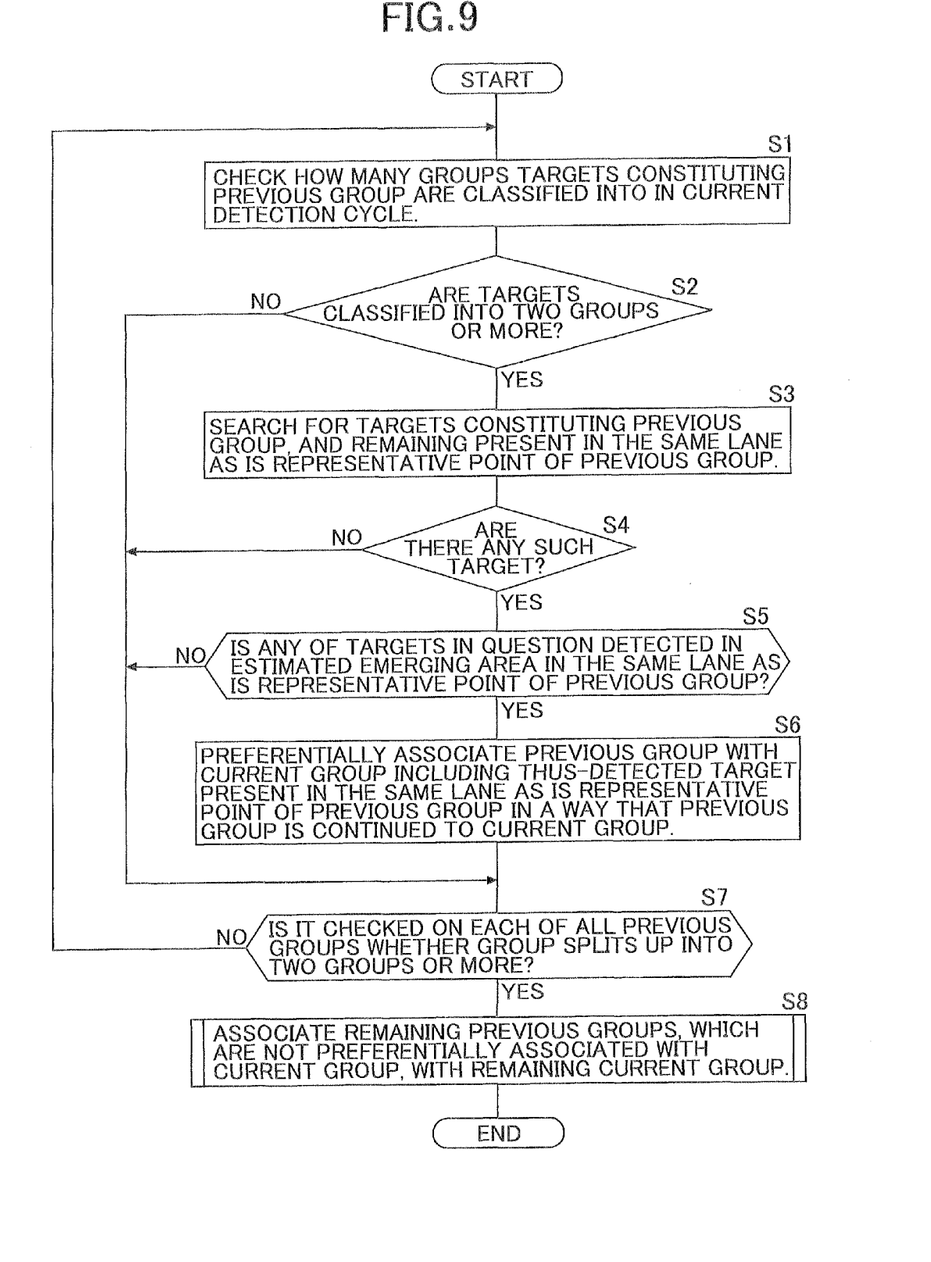
FIG. 9 is a flowchart of a main routine.
Figure 10:
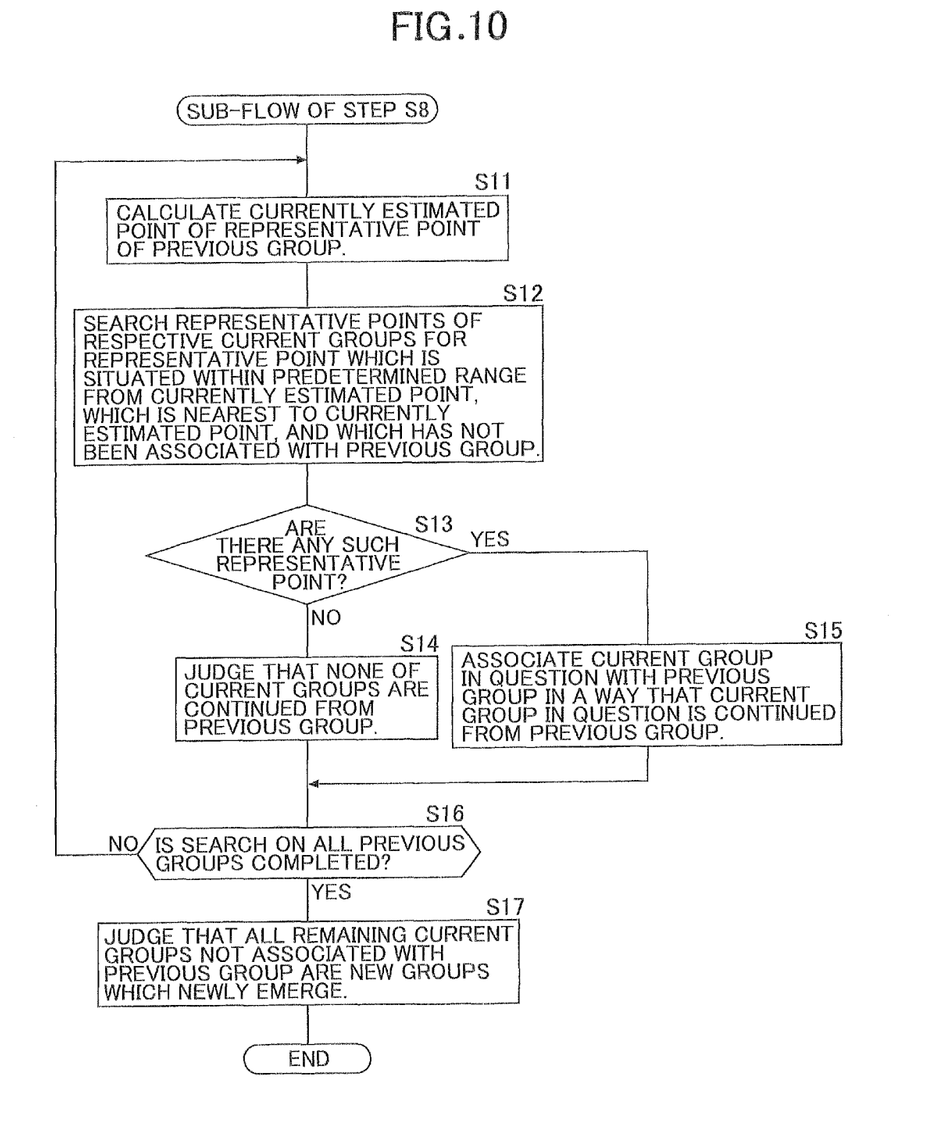
FIG. 10 is a flowchart of a subroutine of step S8 of the main routine shown in FIG. 9.

The tracking operation of the present invention will again be explained based on the flowcharts, respectively, shown in FIGS. 9 and 10.

First, in step S1, it is checked how many groups the targets constituting the previous group have been split up into during the current detection cycle. If the targets are split up into two or more groups in step S2, a search is made for targets constituting the previous group and remaining targets present in the same lane as the representative point of the previous group in step S3. If, as a result of the search, there are targets in question in step S4, it is checked in step S5 whether any of the targets is detected in the estimated emerging area. If any of the targets in question is detected in the estimated emerging area in step S5, of the two or more split groups, a split group including the target remaining present in the same lane as the representative point of the previous group is associated with the previous group prior to the other split groups in step S6.

In step S7, each of the previous groups is checked to determine whether the previous group splits up into two groups or more. Until it is determined in step S7 that the check on all the previous groups is completed, steps S1 to S6 are repeated. Once it is determined in step S7 that the check on all the previous groups is completed, the other previous groups which are not preferentially associated with the current group are associated with the other current group. The associating process carried out by the present invention is the same process as the process used by the object detecting apparatus for a vehicle according to the conventional art. Descriptions will be hereinbelow provided for a subroutine for the associating process based on a flowchart shown in FIG. 10.

First, in step S11, the currently estimated point of the representative point of the previous group is calculated. Subsequently, in step S12, the representative points of the current groups are searched for a representative point which is situated within the predetermined range from the currently estimated point, which is the nearest to the currently estimated point, and which is not associated with the previous group. If, as a result of the search, there are no such representative points in step S13, it is judged in step S14 that none of the current groups are continued from the previous group. If, as a result of the search, such a representative point is found in step S13, the current group represented by such a representative point is associated with the previous group in a way that the current group is continued from the previous group.

Until it is judged in step S16 that the search on each of all the previous groups is completed, steps S11 to S15 are repeated. It is judged in step S17 that the remaining current groups which are not associated with the previous group are new groups which have newly emerged.

Once the arrangement for the previous groups to be tracked by the current groups is completed in this manner, the object information outputting means M6 outputs the group representative point, which results from the tracking arrangement to the vehicle controlling means M9. Thus, the vehicle controlling means M9 controls the vehicle-to-vehicle distance relative to the group representative point, which results from the tracking arrangement.

The foregoing descriptions have been provided for the preferred embodiment of the present invention. However, the present invention can be carried out by variously modifying the structural configuration of the aforementioned features within the scope of the invention and without departing from the gist of the present invention.

For example, the embodiment applies the object detecting apparatus for a vehicle according to the present invention to the vehicle-to-vehicle distance control apparatus, but the object detecting apparatus for a vehicle according to the present invention can be applied to a cruise control apparatus with a vehicle-to-vehicle distance control function, a collision damage reduction brake system, a congestion following running control apparatus, and the like.

What is claimed is:

1. An object detecting apparatus for a vehicle, the object detecting apparatus comprising:
    transmitting/receiving means for transmitting an electromagnetic wave in a driving direction of the vehicle at predetermined intervals and for receiving a reflected wave from an object, the transmitting/receiving means installed in the vehicle;
    object candidate position detecting means for detecting a position of an object candidate based on a result of the transmission and reception performed by the transmitting/receiving means;
    unifying means for unifying a plurality of object candidates into a single group in a case where the plurality of object candidates are detected within a predetermined unified range;
    group representative point calculating means for calculating a representative point of the group unified by the unifying means;
    tracking means for judging whether there is continuity between a group made in a previous detection cycle and a group made in a current detection cycle based on the group representative point calculation;
    object information outputting means for outputting a representative point of a group after a split, based on an output from the group representative point calculating means and an output from the tracking means;
    unified information storage means for storing the object candidates forming each group; and
    running lane estimating means for estimating a running lane in which the vehicle runs, wherein in a case where a change in relative positions of the plurality of object candidates of the single group splits the single group into a plurality of split groups whose representative points are present in different lanes, the tracking means judges whether any of the object candidates forming the group before the split continuously remains to be detected in a running lane including the representative point of the group before the split based on an output from the unified information storage means and an output from the running lane estimating means, and
    in a case where any of the object candidates forming the single group before the split is determined as continuously remaining to be detected in the running lane, the tracking means determines there is continuity between the group after the split including the thus-determined object candidate and the group before the split.

2. The object detecting apparatus for a vehicle according to claim 1, wherein the tracking means sets up an emergence estimation area where an object candidate detected in a previous detection cycle is expected to be detected in a current detection cycle, and
    in a case where an object candidate is detected in the emergence estimation area which is situated in the running lane including the representative point of the group before the split, the tracking means determines that any of the object candidates forming the group before the split is continuously detected in the running lane including the representative point of the group before the split.

3. The object detecting apparatus for a vehicle according to claim 2, wherein the tracking means sets up the emergence estimation area as an area extending longitudinally and transversely which is included within a predetermined range from a previous position of the object candidate.

4. The object detecting apparatus for a vehicle according to claim 1, wherein the running lane estimating means estimates the running lane in which the vehicle runs based on a vehicle speed of the vehicle detected by a vehicle speed sensor and a yaw rate of the vehicle detected by a yaw rate sensor.

5. The object detecting apparatus for a vehicle according to claim 2, wherein the running lane estimating means estimates the running lane in which the vehicle runs based on a vehicle speed of the vehicle detected by a vehicle speed sensor and a yaw rate of the vehicle detected by a yaw rate sensor.

6. The object detecting apparatus for a vehicle according to claim 3, wherein the running lane estimating means estimates the running lane in which the vehicle runs based on a vehicle speed of the vehicle detected by a vehicle speed sensor and a yaw rate of the vehicle detected by a yaw rate sensor.

7. The object detecting apparatus for a vehicle according to claim 1, wherein
    the group representative point calculating means calculates a transverse location of a representative point of a group as a middle position between leftmost and rightmost object candidates among the plurality of object candidates, and calculates a longitudinal location of the representative point of the group as a position of an object candidate which is the nearest to the vehicle among the plurality of object candidates.

8. The object detecting apparatus for a vehicle according to claim 2, wherein
    the group representative point calculating means calculates a transverse location of a representative point of a group as a middle position between leftmost and rightmost object candidates among the plurality of object candidates, and calculates a longitudinal location of the representative point of the group as a position of an object candidate which is the nearest to the vehicle among the plurality of object candidates.

9. The object detecting apparatus for a vehicle according to claim 3, wherein
    the group representative point calculating means calculates a transverse location of a representative point of a group as a middle position between leftmost and rightmost object candidates among the plurality of object candidates, and calculates a longitudinal location of the representative point of the group as a position of an object candidate which is the nearest to the vehicle among the plurality of object candidates.

10. The object detecting apparatus for a vehicle according to claim 4, wherein
    the group representative point calculating means calculates a transverse location of a representative point of a group as a middle position between leftmost and rightmost object candidates among the plurality of object candidates, and calculates a longitudinal location of the representative point of the group as a position of an object candidate which is the nearest to the vehicle among the plurality of object candidates.

11. The object detecting apparatus for a vehicle according to claim 5, wherein
    the group representative point calculating means calculates a transverse location of a representative point of a group as a middle position between leftmost and rightmost object candidates among the plurality of object candidates, and calculates a longitudinal location of the representative point of the group as a position of an object candidate which is the nearest to the vehicle among the plurality of object candidates.

12. The object detecting apparatus for a vehicle according to claim 6, wherein the group representative point calculating means calculates a transverse location of a representative point of a group as a middle position between leftmost and rightmost object candidates among the plurality of object candidates, and calculates a longitudinal location of the representative point of the group as a position of an object candidate which is the nearest to the vehicle among the plurality of object candidates.

\* \* \* \* \*